United States Patent
Li et al.

(10) Patent No.: US 10,662,064 B2
(45) Date of Patent: May 26, 2020

(54) METHOD FOR PREPARING HIGH SPECIFIC SURFACE AREA ACTIVATED CARBON THROUGH RAPID ACTIVATION UNDER FLUIDIZATION

(71) Applicant: Tianjin University of Science & Technology, Tianjin (CN)

(72) Inventors: Zhanyong Li, Tianjin (CN); Xinyuan Gao, Tianjin (CN); Qing Xu, Tianjin (CN); Wei Tian, Tianjin (CN); Ruifang Wang, Tianjin (CN); Jianguo Zhang, Tianjin (CN)

(*) Notice: Subject to any disclaimer, the term of this patent is extended or adjusted under 35 U.S.C. 154(b) by 56 days.

(21) Appl. No.: 16/111,420

(22) Filed: Aug. 24, 2018

(65) Prior Publication Data

US 2018/0362350 A1    Dec. 20, 2018

Related U.S. Application Data

(63) Continuation of application No. PCT/CN2017/084620, filed on May 17, 2017.

(30) Foreign Application Priority Data

May 18, 2016  (CN) .......................... 2016 1 0330257

(51) Int. Cl.
| | | |
|---|---|---|
| *C01B 32/324* | (2017.01) | |
| *C01B 32/312* | (2017.01) | |
| *C01B 32/342* | (2017.01) | |
| *C01B 32/348* | (2017.01) | |
| *C01B 32/39* | (2017.01) | |

(52) U.S. Cl.
CPC .......... *C01B 32/324* (2017.08); *C01B 32/312* (2017.08); *C01B 32/342* (2017.08); *C01B 32/348* (2017.08); *C01B 32/39* (2017.08); *C01P 2006/12* (2013.01)

(58) Field of Classification Search
None
See application file for complete search history.

(56) References Cited

U.S. PATENT DOCUMENTS

| | | | | |
|---|---|---|---|---|
| 2010/0150814 A1* | 6/2010 | Gadkaree | .............. | H01M 4/133 423/445 R |
| 2015/0225245 A1* | 8/2015 | Gadkaree | .............. | H01G 11/38 252/502 |
| 2017/0226535 A1* | 8/2017 | Tudman | ................. | C12M 21/18 |

FOREIGN PATENT DOCUMENTS

| | | |
|---|---|---|
| CN | 101475169 A | 7/2009 |
| CN | 101497439 A | 8/2009 |
| CN | 106006635 A | 10/2016 |

OTHER PUBLICATIONS

Mao et al.; Preparation of Pinewood and Wheat Straw Based Activated Carbon via a Microwave-Assissted Potassium Hydroxide Treatment and an Analysis of the Effects of the Microwave Activation Condistions; BioResources 10(1), 809-821; 2015.*
Internation Search Report of PCT/CN2017/084620, dated Aug. 29, 2017.

* cited by examiner

*Primary Examiner* — Guinever S Gregorio
(74) *Attorney, Agent, or Firm* — Erson IP (Nelson IP)

(57) ABSTRACT

A method for preparing high specific surface area activated carbon through rapid activation, comprises the following steps: 1) selecting biomass raw material with a particle size of 0.3-0.9 mm; immersing the biomass raw material in a chemical reagent for 3-6 hours; and drying the biomass raw material in a constant-temperature drying oven of 100° C.-150° C. after immersing is ended; 2) stirring or crushing the dried material to form granular material after drying is completed; and 3) adopting a fluidized bed or a spouted bed as an activation reactor; increasing the temperature of the activation reactor to 700-800° C.; introducing fluidized gas; placing quartz sand; placing the granular material obtained in step 2); activating for 1-10 min; immediately discharging the material after activation is ended; and washing the material with water until the material is neutral to obtain activated carbon with a specific surface area of 1267-1359 m²/g.

7 Claims, No Drawings

METHOD FOR PREPARING HIGH SPECIFIC SURFACE AREA ACTIVATED CARBON THROUGH RAPID ACTIVATION UNDER FLUIDIZATION

CROSS-REFERENCE TO RELATED APPLICATIONS

This application is a continuation of International Patent Application No. PCT/CN2017/084620 with a filing date of May 17, 2017, designating the United States, now pending, and further claims priority to Chinese Patent Application No. 201610330257.2 with a filing date of May 18, 2016. The content of the aforementioned applications, including any intervening amendments thereto, are incorporated herein by reference.

TECHNICAL FIELD

The present disclosure relates to a method for preparing activated carbon, and more particularly to a method for preparing high specific surface area activated carbon through rapid activation under fluidization.

BACKGROUND OF THE PRESENT INVENTION

Activated carbon is a carbon material with a developed pore structure. It is widely applied to the fields of medicines, environmental protection, food, electrons, chemical industries, agricultures, national defense and the like, particularly applied to aspects such as gas storage, catalyst carriers and sewage treatment, due to its characteristics of large specific surface area, rich surface functional groups, high adsorption capacity and the like.

Because a biomass pyrolysis technology is a technology for turning wastes into treasures, this technology is a hotspot studied by many scholars and can prepare activated carbon, bio-oil, combustible gas and the like. Biomass pyrolysis generally includes slow pyrolysis and fast pyrolysis. The slow pyrolysis generally aims to prepare the activated carbon, and the fast pyrolysis aims to prepare the bio-oil. A heating rate of the slow pyrolysis is generally less than 0.1-1° C. per second, and a heating rate of the fast pyrolysis is generally more than 100-200° C. per second. The slow pyrolysis generally takes relatively long time, and even several days sometimes, to prepare the activated carbon.

Fluidization technologies, particularly a fluidized bed technology, a spouted bed technology and a circulating fluidized bed technology, are more and more widely applied to the field of biomass pyrolysis. Fluidization of biomass in a pyrolysis process not only increases the pyrolysis or activation efficiency of material, but also facilitates feeding and discharging of the material, thereby guaranteeing graininess of the material.

Preparation of the activated carbon includes two methods, namely a physical activation method and a chemical activation method. The physical activation method includes a carbonization step and an activation step. Carbonization temperature is low, and activation temperature is high and is generally 800-1000° C. The physical activation method has the characteristics of simple operation, environmental friendliness and no pollution, but has the disadvantages of long operation time, high activation temperature and low activated carbon quality. Activation gas generally includes $CO_2$ and water vapor. The chemical activation method includes soaking a chemical reagent and the material and activating the mixture at a high temperature, but the activation temperature is low, which is generally 350-600° C. The chemical activation method has the characteristics of complicated operation and severe pollution, but has short operation time, low activation temperature and high activated carbon quality. Common activation reagents include KOH, $H_3PO_4$, $ZnCl_2$ and the like.

Patent 201510383207.6 describes a method for preparing activated carbon. In this method, the carbonization temperature is 500-650° C., the activation time is 40-120 min, and the heating rate is 3-10° C./min.

Patent 201110021089.6 describes a method for preparing activated carbon from biomass wastes. In this method, the carbonization temperature is 400-600° C., and the activation time is 0.5-1.5 min.

Patent 201110193274.3 describes a method for preparing cocoanut activated carbon. Raw materials are carbonized in a flat-bottom carbonization furnace at 900° C. for 5 hours at first, and then are activated at 700° C. for 2 hours.

By checking other patents or documents for preparing the activated carbon, it can be known that in the process of preparing the activated carbon, many researchers select a static reactor without considering the fluidization of the material, but the fluidization of the material can guarantee the graininess of the material, facilitate the discharging of the material and reduce subsequent operation such as crushing of the activated carbon. Then, the activation time is too long, the material heating rate is low, and the operation period is basically 0.5-2 hours, and even longer.

The present disclosure provides a novel method for preparing high specific surface area activated carbon through rapid activation under fluidization. The material in this method is in a fluidized state, so that the method guarantees the graininess of the material and greatly facilitates the feeding and discharging of the material. In addition, the method is extremely short in activation time. In a pyrolysis reactor of the same size, the treatment capacity may be greatly increased, which has a profound effect on industrialization.

SUMMARY OF PRESENT INVENTION

The present disclosure provides a novel method for preparing high specific surface area activated carbon through rapid activation under fluidization, aims to improve the disadvantages of a traditional method for preparing activated carbon, and can prepare high specific surface area activated carbon under fluidization and low activation time.

A method for preparing high specific surface area activated carbon through rapid activation comprises the following steps:

1) selecting biomass raw material with a particle size of 0.3-0.9 mm; immersing the biomass raw material in an activating agent for 3-6 hours; and drying the biomass raw material in a constant-temperature drying oven of 100° C.-150° C. after immersing is ended;

2) stirring or crushing the dried material to form granular material after drying is completed; and 3) adopting a fluidized bed or a spouted bed as an activation reactor; increasing the temperature of the activation reactor to 700-800° C.; introducing fluidized gas; placing quartz sand; placing the granular material obtained in step 2); activating for 1-10 min; immediately discharging the material after activation is ended; and washing the material with water until the material is neutral to obtain activated carbon with a specific surface area of 1267-1359 $m^2/g$.

Moreover, the biomass raw material refers to wood chips, shucks or straws; the wood chips are pine wood chips, candlenut wood chips or cottonwood wood chips; the shucks are walnut shells, peach pits or rice husks; and the straws are wheat straws, maize straws or rice straws and the like.

Moreover, an impregnation ratio of the biomass raw material to the activating agent is 1:1-4.

Moreover, the activating agent is phosphoric acid, zinc chloride or potassium hydroxide and the like.

Moreover, the fluidized gas is one or a mixture of more than two of $N_2$, $CO_2$, water vapor, oxygen and air; and the fluidized gas flow rate of the fluidized gas is 1-2 times of minimum fluidizing speed of the fluidized bed or 1-2 times of minimum spouting speed of the spouted bed.

Moreover, the fluidized gas is the mixture of air and $N_2$, and a volume ratio of the air to $N_2$ is 1:2-5.

Moreover, a fluidized gas outlet of the fluidized bed is connected back to a fluidized gas intake pipeline; and the gas intake pipeline is connected with a draught fan to circulate the fluidized gas.

Moreover, a particle size of the quartz sand is 0.2-0.56 mm; and an addition amount of the quartz sand is: a mass ratio of the quartz sand to the immersed material is 2-5:1.

Moreover, part of the activated granular material passes through the fluidized gas outlet of the activation reactor and is separated and collected via a cyclone separator, and part of the activated granular material is discharged from the bottom of the activation reactor.

Moreover, in the step 3), the activated granular material is washed with acid and then washed with water; and water of 70-100° C. is adopted for washing.

The present disclosure has the following advantages and beneficial effects:

1. The method for preparing high specific surface area activated carbon through rapid activation in the present disclosure is a chemical activation method; the biomass material is immersed in a chemical reagent and then is placed into a high-temperature activation reactor; the fluidized bed or the spouted bed is adopted as the activation reactor; in the method, the biomass material is in a fluidized state; the activation time is 1-10 min and is very short; the processing amount can be greatly increased; and the specific surface area of the obtained activated carbon can reach 1267-1359 $m^2/g$.

2. The method for preparing high specific surface area activated carbon through rapid activation in the present disclosure is suitable for many biomass materials, such as wood chips, shucks, straws and the like; in the present disclosure, the activation temperature is 700-800° C.; after the material is immersed in the chemical reagent, when the material is activated at 700-800° C., the material may aggregate; and to realize fluidization of the material, the quartz sand needs to be added to assist fluidization, thereby realizing rapid activation.

3. In the method for preparing high specific surface area activated carbon through rapid activation in the present disclosure, the material keeps fluidized in the activation process, thereby ensuring graininess of the material, reducing crushing, grinding and other technologies and benefiting feeding and discharging of the material; because the activation time is very short, in the activation reactor of the same size, the processing amount can be greatly increased and a far-reaching effect is generated on industrialization.

4. The present disclosure can realize rapid activating preparation of the activated carbon by adopting a chemical activation method in combination with a fluidized bed technology; the activation time is short; and the prepared activated carbon has high specific surface area, thereby effectively reducing energy consumption and reducing production cost.

DETAILED DESCRIPTION OF PREFERRED EMBODIMENTS

The present disclosure is further described in detail below through specific embodiments.

Embodiment 1

The present embodiment comprises: mixing 85% of phosphoric acid with the materials of pine wood chips for immersing the materials, wherein the particle size of the materials is 0.56-0.9 mm and the mass ratios of the phosphoric acid to the materials are 1:1, 2:1 and 3:1; soaking at room temperature for 3 h; then drying the materials in a constant-temperature drying oven of 105° C. for 10 h; and then stirring the materials into granular materials. Activation is conducted in a spouted bed reactor and the activation temperature is 800° C. After the spouted bed reactor is heated to 800° C., fluidized gas (nitrogen) is introduced. When the immersing ratios ($H_3PO_4$/pine wood chips) are 1:1, 2:1 and 3:1, the fluidized gas flow rates of the fluidized gas are respectively 0.7 $m^3$/h, 1.5 $m^3$/h and 1.9 $m^3$/h. 10 g of granular material is put into the spouted bed reactor, and 20 g of quartz sand is put into the spouted bed reactor. Activation is conducted for 1-10 min. After activation is ended, the granular material and the quartz sand are washed in warm water of 80° C. until the PH is neutral.

The following table shows quality parameters of the activated carbon obtained through rapid activation under fluidized state of the pine wood chips. It can be obtained that the specific surface area of the activated carbon prepared by a phosphoric acid activation method of the pine wood chips is larger. When the activation time is 5 min and the immersing ratio of $H_3PO_4$ is 3:1, the specific surface area of the activated carbon can reach 1359 $m^2/g$ and the total pore volume can reach 1.0569 $cm^2/g$.

| Immersing ratios: $H_3PO_4$/pine wood chips | Activation temperature (° C.) | Activation time (min) | Specific surface area ($m^2/g$) | Total pore volume ($cm^3/g$) |
| --- | --- | --- | --- | --- |
| 1:1 | 800 | 1 | 1024 | 0.5033 |
| 1:1 | 800 | 3 | 1063 | 0.5632 |
| 1:1 | 800 | 5 | 1079 | 0.5694 |
| 2:1 | 800 | 5 | 1208 ± 2 | 0.7873 ± 0.0241 |
| 3:1 | 800 | 5 | 1359 ± 18 | 1.0569 ± 0.0872 |

A chemical activator can remove hydrogen atom and oxygen atom in the raw material at low temperature in the form of dehydration. The phosphoric acid has a dehydration effect in the activation process, and also plays a role of acid catalysis. The phosphoric acid enters the raw material and reacts with inorganic matter of the raw material to generate phosphate so that the raw material is expanded and the distance of carbon microcrystals is increased. The phosphate is removed through washing, so as to obtain a well-developed pore structure. In the process of activation of potassium hydroxide, on one hand, pores are developed by generating potassium carbonate, and on the other hand, when the activation temperature exceeds a boiling point (762° C.) of metallic potassium, potassium vapor may diffuse into different carbon layers to form new pore structures. Gaseous metallic potassium travels between layers of microcrystals, and opens the aromatic layer to distort or deform the aromatic layer, so as to develop new micropores. Generally, zinc chloride, as a dehydrogenation agent, causes a dehydrogenation reaction of cellulose raw materials and further causes aromatization of the raw materials to form a large number of pores.

Embodiment 2

The present embodiment comprises: mixing 85% of phosphoric acid with the materials of walnut shells for immersing the materials, wherein the particle size of the materials is 0.4-0.8 mm and the mass ratios of the phosphoric acid to the materials are 1.5:1 and 2:1; soaking at room temperature for 3 h; then drying the materials in a constant-temperature drying oven of 105° C. for 10 h; and then stirring the materials into granular materials. Activation is conducted in a spouted bed reactor and the activation temperature is 800'C. After the spouted bed reactor is heated to 800° C., fluidized gas (nitrogen) is introduced. When the immersing ratios ($H_3PO_4$/walnut shells) are 1.5:1 and 2:1, the fluidized gas flow rate of the fluidized gas is 1.5 m³/h. 20 g of quartz sand is put, and 10 g of materials is put into the spouted bed reactor. Activation is conducted for 5 min. After activation is ended, the materials are washed in warm water of 80° C. until the PH is neutral.

The following table shows quality parameters of the activated carbon prepared through the walnut shells. It can also be obtained that the high specific surface area activated carbon can be prepared within short activation time by adopting the walnut materials through a chemical activation method of phosphoric acid. At the immersing ratio of 2:1, when the activation time is 5 min. the specific surface area of the obtained activated carbon reaches 1304 m²/g and micropore volume and mesopore volume are respectively 0.7185 cm³/g and 0.4519 cm³/g.

| Immersing ratios: $H_3PO_4$/ walnut shells | Activation temperature (° C.) | Activation time (min) | Specific surface area (m²/g) | Micropore volume (cm³/g) | Mesopore volume (cm³/g) |
|---|---|---|---|---|---|
| 1.5:1 | 800 | 5 | 1226 | 0.6594 | 0.2988 |
| 2:1 | 800 | 5 | 1304 | 0.7185 | 0.4519 |

Embodiment 3

The present embodiment comprises: mixing 85% of phosphoric acid with the materials of wheat straws for immersing the materials, wherein the particle size of the materials is 0.56-0.9 mm and the immersing mass ratios of the phosphoric acid to the wheat straws are 1:1 and 2:1; soaking at room temperature for 3 h; then drying the materials in a constant-temperature drying oven of 105° C. for 10 h; and then stirring the materials into granular materials. Activation is conducted in a spouted bed reactor and the activation temperature is 800° C. Firstly, the spouted bed reactor is heated to 800° C., and then fluidized gas (nitrogen or carbon dioxide) is introduced. When the immersing ratios ($H_3PO_4$/wheat straws) are 1:1 and 2:1, the fluidized gas flow rates of the fluidized gas are respectively 0.7 m³/h and 1.5 m³/h. 30 g of quartz sand is put, and 10 g of materials is put into the spouted bed reactor. Activation is conducted for 5 min. After activation is ended, the materials are rapidly discharged out and washed in warm water of 80° C. until the PH is neutral.

The following table shows quality parameters of the obtained activated carbon. It can be seen that, even if the activation time is only 5 min, the specific surface area of the obtained activated carbon is still large. At the immersing ratio of 2:1, the specific surface area can reach 1267.3 m²/g and the total pore volume reaches 0.9139 cm³/g. However, when the fluidized gas is changed from nitrogen to carbon dioxide, the specific surface area and the pore volume of the obtained activated carbon are larger.

| Immersing ratios: $H_3PO_4$/ wheat straws | Fluidized gas | Total pore volume (cm³/g) | Yield (%) | Specific surface area $S_{BET}$ (m²/g) | Microporous contribution |
|---|---|---|---|---|---|
| 1:1 | Nitrogen | 0.4727 | 42 | 782.59 | 0.6891 |
| 1:1 | Carbon dioxide | 0.6727 | 36 | 1118.5 | 0.673 |
| 2:1 | Nitrogen | 0.9139 | 44 | 1267.3 | 0.5504 |

We claim:

1. A method for preparing high specific surface area activated carbon through activation, comprising the following steps:
   1) selecting biomass raw material with a particle size of 0.3-0.9 mm; immersing the biomass raw material in an activating agent for 3-6 hours; and drying the biomass raw material in a constant-temperature drying oven of 100° C.-150° C. after immersing is ended;
   2) stirring or crushing the dried material to form granular material after drying is completed; and
   3) increasing a temperature of an activation reactor to 700-800° C., wherein the activation reactor is a fluidized bed or a spouted bed; introducing fluidizing gas; placing quartz sand; placing the granular material obtained in step 2); activating for 1-10 min; immediately discharging the material after activation is ended; and washing the material with water until the material's PH is neutral to obtain activated carbon with a specific surface area of 1267-1359 m²/g; wherein,
   an impregnation ratio of the biomass raw material to the activating agent is 1:1-4, and the activating agent is phosphoric acid, zinc chloride or potassium hydroxide; and
   a fluidizing gas outlet of the fluidized bed is connected back to a fluidizing gas intake pipeline; and the gas intake pipeline is connected with a draught fan to circulate the fluidizing gas.

2. The method for preparing high specific surface area activated carbon through activation according to claim 1, wherein the biomass raw material refers to wood chips, shucks or straws; the wood chips are pine wood chips, candlenut wood chips or cottonwood wood chips; the shucks are walnut shells, peach pits or rice husks; and the straws are wheat straws, maize straws or rice straws.

3. The method for preparing high specific surface area activated carbon through activation according to claim 1, wherein the fluidizing gas is one or a mixture of more than two of $N_2$, $CO_2$, water vapor, oxygen and air; and the fluidizing gas flow rate of the fluidizing gas is 1-2 times of minimum fluidizing speed of the fluidized bed or 1-2 times of minimum spouting speed of the spouted bed.

4. The method for preparing high specific surface area activated carbon through activation according to claim 3, wherein the fluidizing gas is the mixture of air and $N_2$, and a volume ratio of the air to $N_2$ is 1:2-5.

5. The method for preparing high specific surface area activated carbon through activation according to claim 1, wherein a particle size of the quartz sand is 0.2-0.56 mm; and an addition amount of the quartz sand is: a mass ratio of the quartz sand to the immersed material is 2-5:1.

6. The method for preparing high specific surface area activated carbon through activation according to claim 1, wherein part of the activated granular material passes through the fluidizing gas outlet of the activation reactor and is separated and collected via a cyclone separator, and part of the activated granular material is discharged from the bottom of the activation reactor.

7. The method for preparing high specific surface area activated carbon through activation according to claim 1, wherein in the step 3), the activated granular material is washed with acid and then washed with water; and water of 70-100° C. is adopted for washing.

* * * * *